United States Patent [19]

Sedighzadeh

[11] Patent Number: 5,148,282
[45] Date of Patent: Sep. 15, 1992

[54] SUPPORT STRUCTURE FOR TELEVISION MONITOR

[76] Inventor: Marty Sedighzadeh, 11504 W. Berry Pl., Littleton, Colo. 80127

[21] Appl. No.: 554,701

[22] Filed: Jul. 18, 1990

[51] Int. Cl.⁵ .............................................. H04N 5/655
[52] U.S. Cl. .................... 358/249; 358/255; 358/229; 312/7.2
[58] Field of Search ............... 358/248, 249, 254, 255, 358/229; 312/7.1, 7.2; 248/185, 317, 343, 323, 922, 917, 285, 247; 297/422; 5/461; 428/247; 52/481, 568

[56] References Cited

U.S. PATENT DOCUMENTS

| | | |
|---|---|---|
| 237,405 | 10/1975 | Bednar et al. |
| 272,066 | 1/1984 | Larsen |
| 294,260 | 2/1988 | Yankovec |
| 303,675 | 9/1989 | Beaver |
| 307,915 | 5/1990 | Kuester, III |
| 3,574,340 | 4/1971 | Busche ......................... 248/324 |
| 4,633,322 | 12/1986 | Fourny ......................... 358/255 |
| 4,964,606 | 10/1990 | Beam et al. .................... 248/333 |
| 4,993,676 | 2/1991 | Fitts et al. ..................... 312/7.2 |
| 5,021,763 | 6/1991 | Obear ........................... 358/229 |

FOREIGN PATENT DOCUMENTS

| | | | |
|---|---|---|---|
| 2528955 | 1/1977 | Fed. Rep. of Germany | 248/324 |
| 3639863 | 6/1988 | Fed. Rep. of Germany | 5/640 |

Primary Examiner—Jin F. Ng
Assistant Examiner—Nina Tong
Attorney, Agent, or Firm—Gary M. Polumbus

[57] ABSTRACT

A support structure for a television monitor includes an anchor in the form of a swivel which can be secured to a ceiling joist and includes a unique framework suspended therefrom that includes a tray on which a television monitor can be seated. A detachable shell is adapted to be connected to the framework so as to enclose the framework as well as the television monitor in an aesthetically pleasing manner. The shell has a tinted plexiglass window through which the monitor can be seen when in operation, but prevents viewing of the monitor when it is not operative. A flexible wall mounted in the shell is adapted to be moved between a first position wherein it overlies the tinted window and a second position that is unobstructive of the window.

9 Claims, 3 Drawing Sheets

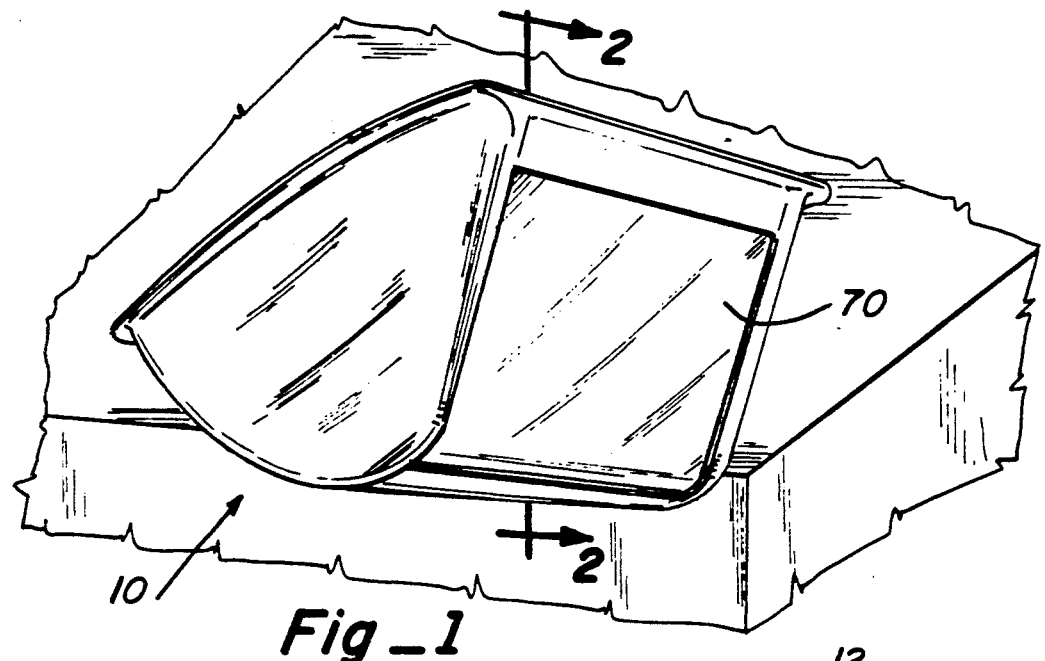
Fig_1
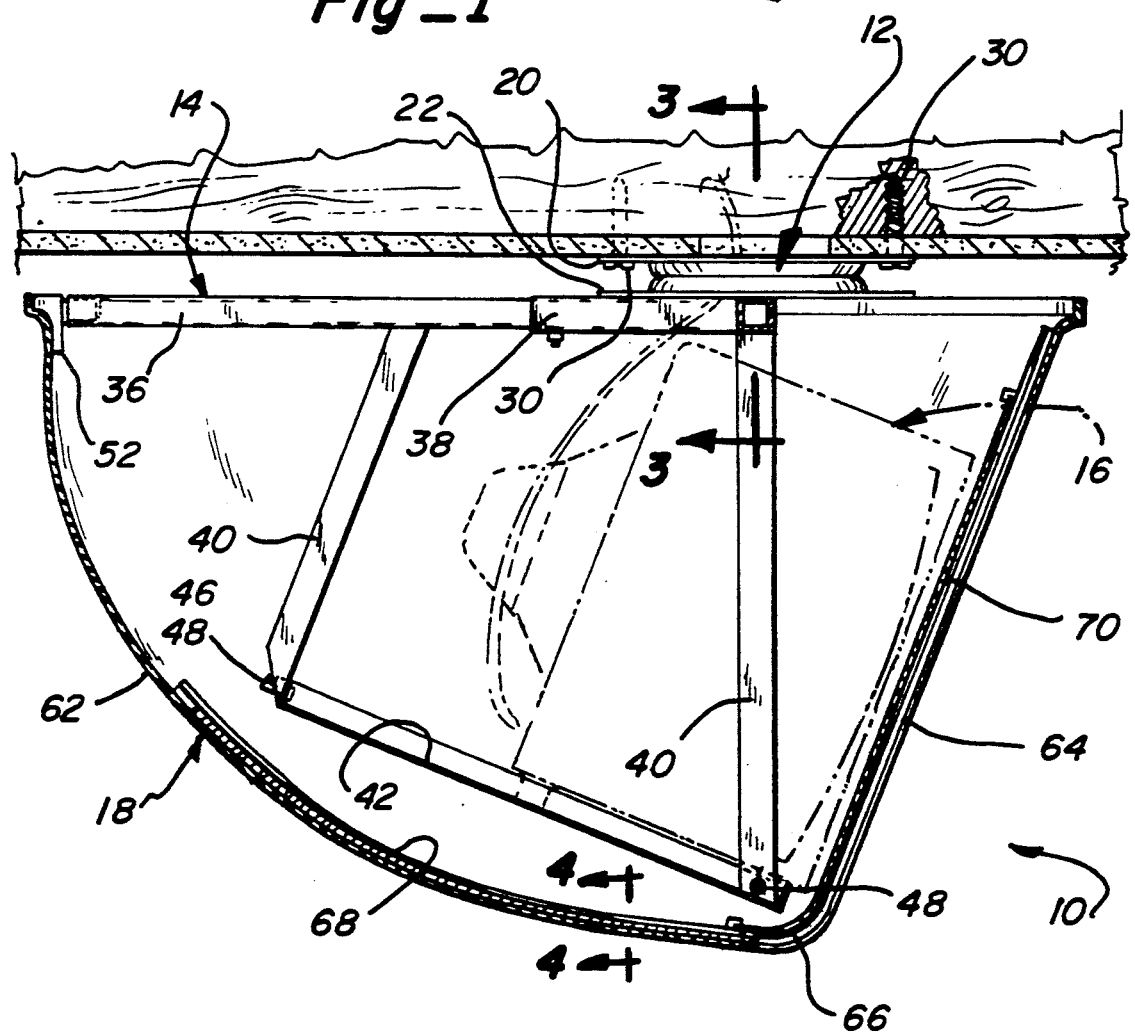
Fig_2

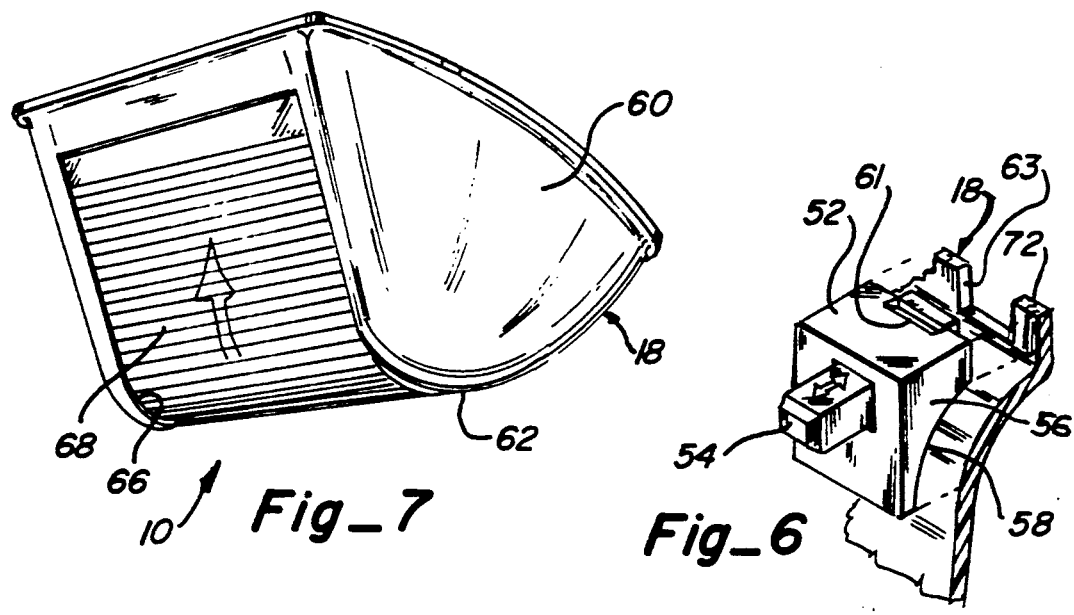
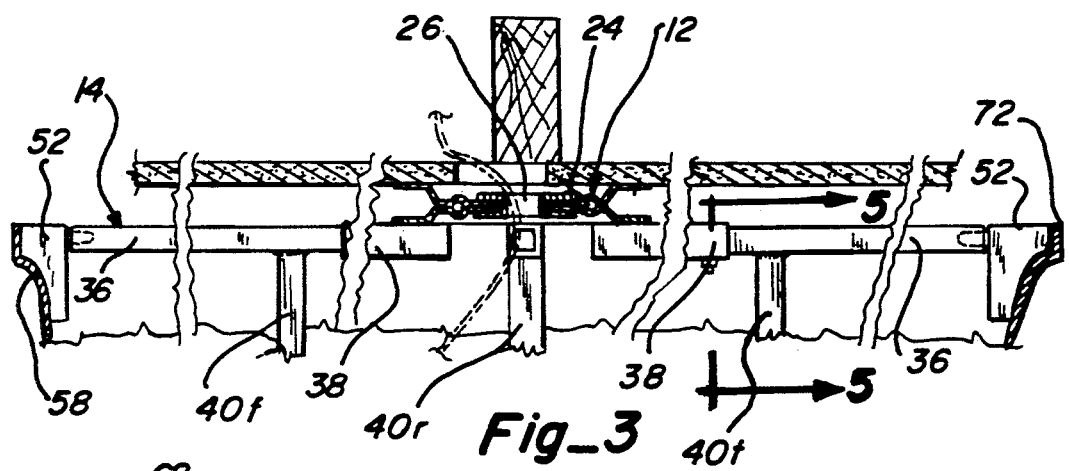
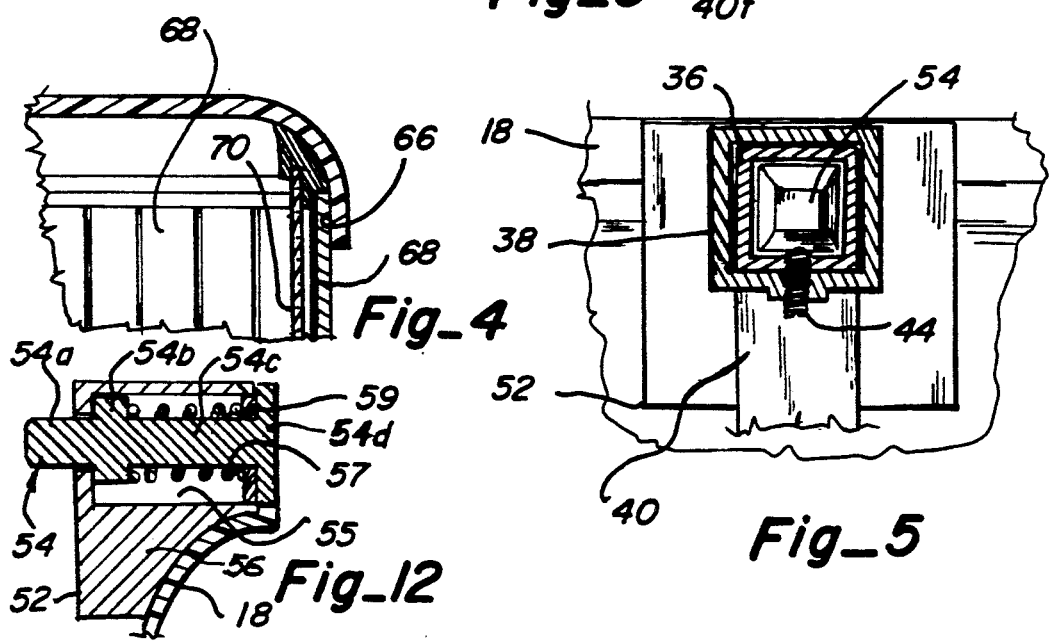

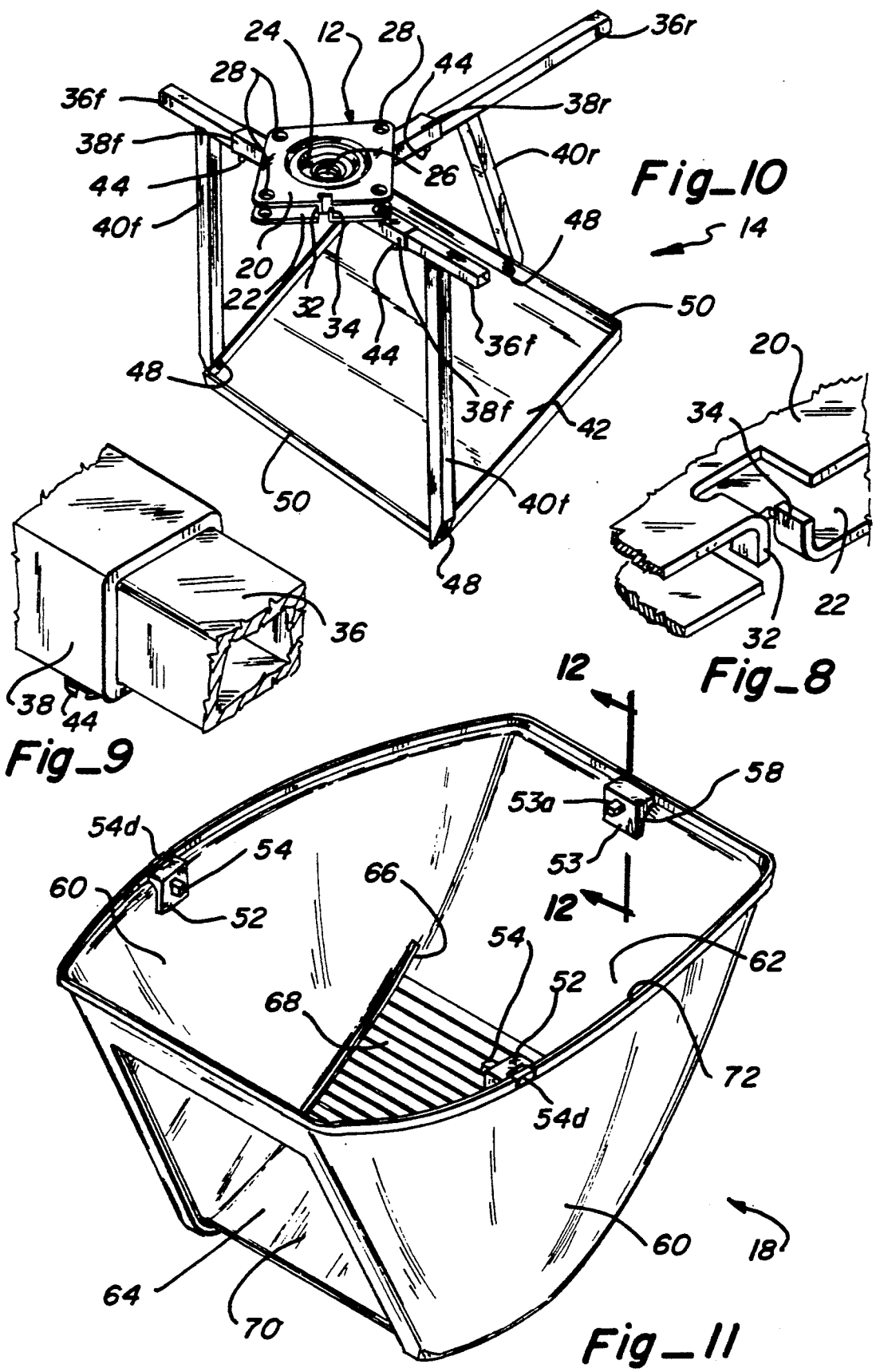

SUPPORT STRUCTURE FOR TELEVISION MONITOR

BACKGROUND OF THE INVENTION

1. Field of the Invention

The present invention relates generally to supporting structure for television monitors, and more particularly, to a support structure adapted to be suspended from a ceiling joist.

2. Description of the Prior Art

Even though television monitors in recent years have been reduced in size through the miniaturization of electronic components, the monitors still require substantial shelf or table-top space when positioned for convenient viewing. Larger television monitors, of course, are of the console-type and merely sit on the floor but again take up valuable space in a room. In some environments such as hospital rooms, taverns, or the like, floor, shelf and table-top space is many times not available and to remedy the problem, television monitors have been suspended by appropriate structure from a wall or ceiling of the room. An example of a suspension system for a television of the type that might be mounted on a ceiling joist is shown in U.S. Pat. No. 3,574,340 issued to Kenneth A. Busche on Apr. 13, 1971. The device illustrated in the Busche patent includes a swivel mounting plate from which a pair of oppositely directed support arms extend laterally of the television monitor an support arcuate hanger elements that are adapted to be secured by attachment to the side walls of the television monitor. A system of the type disclosed in the Busche patent solves the space problem in that the television monitor is suspended from the ceiling in an out-of-the-way location but is done so in a manner that is not aesthetically appealing and also defaces the housing of the television monitor so that it would not be aesthetically appealing if later converted from the suspended mounting to use on a table-top or the like.

Television monitor housings have taken unique configurations and are not always of a simple rectangular configuration. An example of a design for a television monitor is shown in design Pat. No. 255,447 issued to Roland Dahlstrom on Jun. 17, 1980. A television monitor of the type illustrated in the Dahlstrom patent, however, would appear to be designed to rest on a supporting surface such as a table or counter top and would also appear to be oriented for viewing by one or a small number of individuals.

The concept of mounting television equipment on a ceiling in a relatively attractive housing is not new in that U.S. Design Pat. No. 273,012 issued to Edward Kozloski on Mar. 13, 1984, discloses a housing for a surveillance camera which would appear to be mountable on a ceiling in a reasonably attractive manner.

The prior art would appear to be devoid, however, of a system for supporting television monitor from a ceiling in a manner which is aesthetically pleasing without defacing or degrading the television monitor itself and such that the monitor can be positioned for easy viewing by large numbers of individuals in a room. It is to overcome the shortcomings in the prior art that the present invention has been developed.

SUMMARY OF THE INVENTION

The television monitor support structure of the present invention includes an anchor adapted to be secured to a ceiling joist and having suspended therefrom a unique framework on which a television monitor can be seated in a manner so as not to deface the television monitor itself. An aesthetically attractive shell is releasably connectable to the framework so as to enclose the framework and the television monitor seated thereon such that the television monitor is suitably disposed for easy viewing within the room in which the structure is mounted.

In the preferred embodiment of the invention, the anchor is in the form of swivel with the framework depending therefrom having a planar-inclined tray on which a television monitor can be easily seated. The swivel includes a central passage therethrough so that electrical and antenna wiring can pass from the television monitor through the swivel anchor to an attic or like space where they can respectively be connected to a suitable source of electrical power and a suitable antenna or cable system.

The shell which surrounds and encloses the framework and television monitor includes releasable fasteners which quickly and easily snap into the framework so that ready access to the monitor is available should repairs be required. As mentioned previously, since the television monitor is merely seated on the tray of the support structure, should repairs be necessary, it can be easily removed therefrom and taken to a remote location for repair work.

In the preferred embodiment of the invention, the shell includes a tinted transparent window through which the television monitor can be viewed when in operation, but when not in operation, the television monitor is not readily seen through the window. In addition, a sliding wall on the shell can be selectively moved into a position overlying and therefore blocking the transparent window primarily for aesthetic reasons.

An added feature of the invention resides in the fact that the structure is formed from severable parts enabling it to be easily installed. In other words, the swivel can be simply connected to a ceiling joist before the depending framework and shell are connected thereto. In this manner, the individual installing the structure does not have to support and work around the depending frame members, allowing the structure to be installed in a matter of minutes.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a fragmentary isometric view of the support structure of the present invention mounted on the ceiling in a room.

FIG. 2 is an enlarged section taken along line 2—2 of FIG. 1.

FIG. 3 is an section taken along line 3—3 of FIG. 2.

FIG. 4 is an enlarged section taken along line 4—4 of FIG. 2.

FIG. 5 is an enlarged section taken along line 5—5 of FIG. 3.

FIG. 6 is a fragmentary isometric view of a connector member utilized and releasably retaining the shell of the support structure on the framework.

FIG. 7 is an isometric view of the support structure of the present invention with the flexible wall moved into an overlying position with the window of the shell.

FIG. 8 is an enlarged fragmentary view of the abutment stop utilized to limit pivotal movement of the support structure.

FIG. 9 is an enlarged fragmentary isometric view of a portion of the framework illustrating the interconnection between frame member and sleeves for adjusting the size of the framework.

FIG. 10 is an isometric view of the framework of the support structure of the present invention.

FIG. 11 is an isometric view looking downwardly through the opening in the shell of the support structure of the present invention.

FIG. 12 is a section taken through a connector member having a resilient pin mounting.

DESCRIPTION OF THE PREFERRED EMBODIMENT

Referring first to FIG. 2, the support structure 10 of the present invention can be seen to include a swivel anchor 12, a framework 14 suspended from the anchor 12 which is adapted to support a television monitor 16, and an enclosing shell 18 releasably attached to the framework 14 in a manner so as to enclose the framework 14 and a television monitor supported thereon.

The swivel anchor 12 may be of a relatively conventional type having an upper plate 20, a lower plate 22 and a low friction bearing system 24 therebetween so that the plates are relatively pivotable about a vertical axis as viewed in FIG. 3. The center of the swivel anchor has an opening 26 therethrough of approximately one inch diameter to receive electrical and antenna cables as will be explained in more detail later. The upper surface of the top plate and the lower surface of the bottom plate are concave for a reason to become more clear later.

The upper and lower plates 20 and 22 respectively in the preferred embodiment are of generally square configuration with the upper plate 20 having four holes 28 therethrough disposed in each corner of the plate. The holes are adapted to receive screw-type fasteners 30 to fasten the swivel to a ceiling joist or the like. As will be appreciated, the four holes 28 define two pair of diametrically opposed but aligned holes, either pair of which can be positioned along the length of a ceiling joist so that two screw-type fasteners can be anchored in the ceiling joist. Access to each fastener with a screwdriver or the like is easily obtained by rotating the bottom plate 22 relative to the top plate 20 so that they are approximately 45 degrees offset.

An abutment stop 32 is formed in the top plate 20 and projects downwardly therefrom while an abutment stop 34 is formed in the bottom plate 22 and projects upwardly therefrom. The abutment stops 32 and 34 are positioned to abut each other on pivotal movement of the plates 20 and 22 allowing approximately 358 degrees of relative movement. The abutment stops thereby prevent complete relative rotational movement between the plates to prevent excessive twisting of the electrical and antenna wires that extend through the swivel anchor.

The framework 14 for the support structure 10 includes horizontal frame members 36, horizontal frame member sockets or sleeves 38, suspension frame members 40, and a support tray 42 on which the television monitor 16 can be seated. The horizontal frame member sockets or sleeves 38 in the preferred embodiment are square tubular members which are welded to the bottom of the bottom plate 22 of the swivel anchor 12 in a positive and secure manner. In the preferred embodiment, there are two front oppositely-directed longitudinally aligned tubular sockets 38f which extend laterally of the apparatus and are longitudinally spaced from each other at the center of the swivel anchor so as to provide access to the central opening 26. A third rear tubular socket 38r extends rearwardly from the front sockets 38f and is disposed perpendicularly thereto again not blocking the opening 26 through the center of the swivel anchor so that access thereto is readily available for the electrical and antenna wiring. Each tubular socket 38 has threaded opening in a side wall thereof for receipt of a screw 44 for a purpose to be described hereinafter.

The horizontal frame members 36 are preferably also of square tubular construction but of a slightly smaller dimension than the tubular sockets 38 so as to be telescopically received therein. There are two front horizontal frame members 36f and one rear horizontal frame member 36r with each being secured in an associated tubular socket 38 by a screw 44 which is threadedly received in a threaded hole in the horizontal frame member when the hole is aligned with the threaded opening in the associated tubular socket. When anchored in the tubular sockets, the horizontal frame members are arranged in a generally T-shaped configuration. The horizontal frame members are of a predetermined length so as to protrude laterally and rearwardly from the swivel a predetermined distance.

The suspension frame members 40 include a pair of front suspension frame members 40f and a rear suspension frame member 40r. The front suspension frame members are welded to and extend vertically downwardly from the front horizontal frame members 36f. The rear suspension frame member 40r is welded to the rear horizontal frame member 36r at an intermediate location along its length. The rear suspension frame member 40r extends rearwardly and downwardly while forming an acute angle of approximately 69 degrees with the rear horizontal frame member 36r. The suspension frame members 40, like the horizontal frame members 36, are preferably of square tubular construction and the lower end of each suspension frame member is tapered at 46 so that an innermost side of the frame member is exposed from the interior whereby a fastener 48 can be passed therethrough for connection to the support tray 42.

The support tray 42 is a generally planar rectangular sheet of steel, aluminum, plastic or the like, having an up-turned edge 50 along its perimeter. The suspension frame members 40 are secured by the fasteners 48 to the upturned edge of the tray at the forwardmost ends of the sides of the tray, in the case of the front suspension frame members 40f, and at a centered location along the rear edge of the tray in the case of the rear suspension frame member 40r. The rear suspension frame member is perpendicularly related to the tray 42. The front suspension frame members are longer than the rear suspension frame member so that when the tray is connected thereto, it forms an angle of approximately 21 degrees with horizontal whereby the television monitor 16 seated thereon will be directed forwardly and downwardly at a desirable viewing angle. It will be appreciated that the forwardmost upturned edge of the tray 42, where a substantial portion of the weight of the television monitor is focused, is positioned vertically beneath the center of the swivel anchor 12. This places a minimal amount of torque or bending stress on the swivel anchor providing prolonged use.

With reference to FIGS. 6 and 12, connector members 52, bonded or otherwise secured to opposite sides of the shell 18, are adapted to be releasably received in the open ends of the two front horizontal tubular frame members 36f so as to releasably connect the shell 18 to the framework 14. A third connector member 53 of slightly different construction is secured to the rear edge of the shell to be releasably received in the open end of the rear horizontal frame member 36r. The connector members 52 are both identical and can be seen to include a block-type body portion 56 and a square male pin or peg 54 retractably mounted in a cavity 55 of the body of the connector 52 and adapted to be slidably received in the open end of an associated front square tubular horizontal frame member 36f. The body portion 56 of the connector has a contoured recess 58 formed thereon adapted to matingly engage a corresponding surface of the shell 18 so as to be easily bonded or otherwise secured thereto.

The pin 54 of the connector members has a protruding head portion 54a, an enlarged shoulder 54b immediately therebehind, a shaft portion 54c, and a finger plate 54d at its trailing end. The head portion 54a protrudes through a square hole in the body 56 of the connector with the shoulder 54b being abuttable against an inner wall of the cavity 55. A coil spring 57 surrounds the shaft portion 54c of the pin and abuts the shoulder 54b at one end and a reaction ring 59 at the opposite end. The reaction ring 59 is secured to the body of the connector to retain the pin in the position shown in FIG. 12. A small recess 61 (FIG. 6) is provided in the top wall of the body of the connector so that an individual's finger can grip the upper edge of the finger plate 54d and pull the pin rearwardly to retract the protruding head when connecting or disconnecting the shell from the framework 14.

As illustrated in FIG. 6, notches 63 are formed in each side of the shell 18 at the location where the connector is secured to the shell and the finger plate 54d is positioned in an associated notch for easy access by an individual.

The connector member 53 at the rear edge of the shell 18 is slightly different from the connector members 52 in that it includes a pin 53a that is fixed relative to the connector body. The manner in which the connector members 52 and 53 are operative to secure the shell 18 to the framework 14 will be described in more detail hereinafter.

The shell 18, which is probably best seen in FIGS. 1 and 7 through 11, is somewhat futuristic in appearance having an open top, a pair of generally triangularly shaped sidewalls 60, and a slightly upwardly and rearwardly curved bottom wall 62, which is continuous with an open front 64 of the shell, the open front of the shell forming a substantially perpendicular angle with the support tray 42. A continuous or track groove 66 is provided along the lower edges of each sidewall in which the sides of a flexible wall 68 can be confined. The flexible wall may be of the type conventionally used on roll-top desks and includes a plurality of parallel hingedly interconnected slats. The wall 68 easily slides within the opposing tracks 66 between a position in which it covers the opening 64 in the front of the shell and a position lying interiorly of and adjacent to the bottom wall 62 of the shell in which case the opening is left unobstructed. The opening or window 64 in the shell has permanently mounted therein a tinted plexiglass pane 70 which is disposed inwardly of the flexible wall 68 so that when the flexible wall is moved into its closed position of FIG. 7, the flexible wall overlies and obstructs the window. However, when the flexible wall is moved to its open position wherein it is unobstructive of the window, the screen of the television monitor 16 positioned interiorly of the shell can be viewed through the window. Appropriate tinting of the window, however, may be used to render the television monitor difficult to see when the monitor is not operative thus lending to the aesthetic appeal of the support structure 10 of the present invention.

As will be appreciated, a perimeter portion 72 of the shell 18 around the open top and which is adjacent to the ceiling when the shell is mounted on the framework 14, has a curved surface that is complimentary with the contoured recess 58 in the connector members 52 and 53 so that the connector members can be easily bonded or otherwise secured to the perimeter portion 72. As mentioned previously, the shell is appropriately notched at two locations along the side walls 60 to permit access to the pins 54 of the connector members 52. The shell is easily attached to the framework by first inserting the pin 53a on the rear connector member into the open end of the rear horizontal frame member 36r and then lifting the front portion of the shell while retracting the pins 54. After aligning the pins 54 with the associated open ends of the front horizontal frame members 36f, the pins are released and allowed to protrude into the open ends of the horizontal frame members, thereby releasably securing the shell to the framework 14. When the shell is secured to the framework, there is a small gap between the upper edge of the shell and the ceiling allowing an individual to insert his finger into the recess 61 to retract the pins 54 when it is desired to remove the shell from the framework.

It will be readily appreciated that the support structure 10 of the present invention, can be easily connected to a ceiling joist by aligning a pair of holes 28 in the upper plate 20 of the swivel anchor 12 with a ceiling joist and passing suitable screwtype fasteners through the openings into the joist. After the swivel anchor has been anchored to the ceiling joist, the horizontal frame members 36 are placed in the tubular sockets 38 and anchored into fixed positions relative thereto by the screws 44. The support tray 42 can next be easily affixed to the lower ends of the suspension frame members 40 so that the structure is ready to receive and support the television monitor 16. Once the tray 42 has been attached to the suspension frame members, the television monitor can be placed on the tray with the electrical cord and on antenna wiring being extended through the center opening 26 in the swivel anchor 12 and into a space where they can be connected respectively to a suitable electrical power source and an antenna or cable system. The electrical cord and antenna wiring after being extended through the center opening 26, is bent to pass along the concave top surface of the upper plate 20 thereby passing around the ceiling joist to which the swivel anchor is affixed. With the television monitor properly seated on the framework, the shell 18 is merely secured in place via the connector members 52 and 53 so as to completely enclose the framework 14 and the television monitor 16 seated thereon. The various component parts of the support structure allow the structure to be easily installed in a few simple steps and further allow quick and easy partial disassembly to permit access to the television monitor for repairs or the like.

Although the present invention has been described with a certain degree of particularity, it is understood that the present disclosure has been made by way of example, and changes in detail or structure may be made without departing from the spirit of the invention, as defined in the appended claims.

I claim:

1. A support structure for a television monitor comprising in combination, anchor means adapted to be secured to a ceiling, a framework secured to and suspended from said anchor means, said framework including a tray spaced beneath said anchor means and adapted to form a seat upon which a television monitor can be supported, and a system of frame members linking the tray to the anchor means to hold the tray in a predetermined position relative to said anchor means, said frame members including horizontal frame members extending from said anchor means and defining a T-shaped configuration and suspension frame members depending from said horizontal frame members and interconnecting the horizontal frame members with the tray.

2. The support structure of claim 1 wherein there is at least one front horizontal frame member and a rear horizontal frame member extending perpendicularly to said front horizontal frame member, said rear horizontal frame member extending rearwardly from said anchor means.

3. The support structure of claim 2 wherein there are front suspension frame members depending from each end of the front horizontal frame member and a rear suspension frame member depending from the rear horizontal frame member and wherein the lowermost ends of the suspension frame members are secured to the tray to support the tray in the predetermined position.

4. The support structure of claim 3 wherein said tray is supported so as to form an acute angle with horizontal.

5. The support structure of claim 4 wherein said rear suspension frame member forms a right angle with said tray.

6. A support structure for a television monitor comprising in combination:

a swivel member having an upper plate adapted to be secured to a ceiling, a lower plate adapted to support a framework, and low friction bearing means interconnecting the upper and lower plates, a framework secured to said lower plate, said framework including a pair of laterally directed tubular sleeves secured to said lower plate, a rearwardly directed tubular sleeve secured to said lower plate in perpendicular relationship to said laterally directed tubular sleeves, a pair of front horizontal frame members telescopically received in said laterally directed tubular sleeves, a rear horizontal frame member telescopically received in said rearwardly directed tubular sleeves, means for securing the front and rear horizontal frame members in said respective tubular sleeves, a pair of front suspension frame members secured at an upper end to an associated one of said front horizontal frame members, a rear suspension frame member secured at an upper end to said rear horizontal frame member, a generally planar tray attached to said suspension frame members for supporting a television monitor, said tray being inclined forwardly and downwardly, and an enclosing shell releasably attached to said framework to enclose the framework, said shell including a transparent window adapted to be in alignment with the screen of said television monitor whereby the screen can be viewed from externally of the shell.

7. The support structure of claim 6 wherein said shell further includes a sliding wall adapted to selectively cover said window.

8. A support structure for a television monitor comprising in combination, anchor means adapted to be secured to a ceiling, a framework secured to and suspended from said anchor means, said framework including a tray spaced beneath said anchor means and adapted to form a seat upon which a television monitor can be supported, said framework including a system of frame members linking the tray to the anchor means to hold the tray in a predetermined position relative to said anchor means, and an enclosing shell having quick release connection means releasably connecting the shell to said framework whereby said framework and any television monitor supported therein is enclosed within said shell, said shell including a solid sheet window pane positioned in alignment with the screen of a television monitor supported on said framework and further including an opaque slidable wall adapted to be moved into and out of overlying relationship with said window pane to selectively prevent viewing of said television through said window pane.

9. A support structure for a television monitor comprising in combination, anchor means adapted to be secured to a ceiling, a framework secured to and suspended from said anchor means, said framework including a tray spaced beneath said anchor means and adapted to form a seat upon which a television monitor can be supported, said framework including a system of frame members linking the tray to the anchor means to hold the tray in a predetermined position relative to said anchor means, said horizontal frame members being of tubular construction and having open ends, and wherein said connection means are seated in the open ends of said horizontal frame members, and an enclosing shell having quick release connection means releasably connecting the shell to said framework whereby said framework and any television monitor supported therein is enclosed within said shell.

* * * * *